United States Patent
Pallardy et al.

(10) Patent No.: US 12,547,555 B2
(45) Date of Patent: Feb. 10, 2026

(54) METHOD FOR MANAGING ACCESS RIGHTS OF MEMORY REGIONS AND CORRESPONDING SYSTEM ON CHIP

(71) Applicant: STMicroelectronics (Grand Ouest) SAS, Le Mans (FR)

(72) Inventors: Loic Pallardy, Rouillon (FR); Lionel Debieve, Fille (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 220 days.

(21) Appl. No.: 18/346,512

(22) Filed: Jul. 3, 2023

(65) Prior Publication Data
US 2024/0004804 A1    Jan. 4, 2024

(30) Foreign Application Priority Data
Jul. 4, 2022 (FR) .................................. FR2206736

(51) Int. Cl.
*G06F 12/14* (2006.01)
*G06F 21/64* (2013.01)

(52) U.S. Cl.
CPC .......... *G06F 12/1458* (2013.01); *G06F 21/64* (2013.01)

(58) Field of Classification Search
CPC .... G06F 12/1458; G06F 21/64; G06F 9/5016; G06F 12/1491; G06F 21/79; G06F 2212/1052; G06F 12/1441
See application file for complete search history.

(56) References Cited

U.S. PATENT DOCUMENTS

| | | | | |
|---|---|---|---|---|
| 2007/0226795 A1* | 9/2007 | Conti | .................... | G06F 21/554 726/22 |
| 2011/0047543 A1* | 2/2011 | Mohinder | ............... | G06F 21/53 718/1 |
| 2013/0091318 A1* | 4/2013 | Bhattacharjee | ....... | G06F 12/145 711/6 |
| 2013/0185792 A1* | 7/2013 | Balakrishnan | .......... | G06F 21/54 726/22 |
| 2015/0052325 A1* | 2/2015 | Persson | ............... | G06F 12/1433 711/163 |
| 2015/0052616 A1* | 2/2015 | Hutchison | ............. | G06F 3/0632 726/27 |
| 2015/0121354 A1* | 4/2015 | Gschwind | ........... | G06F 9/30134 717/157 |
| 2015/0215335 A1* | 7/2015 | Giuliani | ................ | G06F 21/554 726/23 |
| 2016/0132322 A1* | 5/2016 | Jones | ....................... | G06F 8/654 717/168 |
| 2016/0283720 A1* | 9/2016 | Chen | ..................... | G06F 21/577 |

(Continued)

FOREIGN PATENT DOCUMENTS

| | | |
|---|---|---|
| EP | 3462362 A1 | 4/2019 |
| EP | 1987430 B1 | 8/2019 |
| EP | 3675125 A1 | 7/2020 |

*Primary Examiner* — Khalid M Almaghayreh
(74) *Attorney, Agent, or Firm* — Slater Matsil, LLP

(57) ABSTRACT

The method for managing access rights of memory regions of a memory comprises assigning an execution permission status for each memory region in a firewall device dedicated to the memory, so that the content of a memory region having an executable status is capable of being executed by a processor, and the content of a memory region having a non-executable status cannot be executed by the processor.

20 Claims, 2 Drawing Sheets

(56) References Cited

U.S. PATENT DOCUMENTS

| | | | |
|---|---|---|---|
| 2016/0378975 A1* | 12/2016 | Pikhur | G06F 21/52 |
| | | | 726/23 |
| 2018/0181498 A1* | 6/2018 | Makowski | G06F 21/51 |
| 2018/0253557 A1* | 9/2018 | Schilder | G06F 21/575 |
| 2018/0330092 A1* | 11/2018 | Sniezek | G06F 21/57 |
| 2019/0205190 A1* | 7/2019 | Hebbal | G06F 9/455 |
| 2019/0205537 A1* | 7/2019 | Das | G06F 21/566 |
| 2022/0300314 A1* | 9/2022 | Musalay | G06F 9/45558 |

* cited by examiner

METHOD FOR MANAGING ACCESS RIGHTS OF MEMORY REGIONS AND CORRESPONDING SYSTEM ON CHIP

CROSS-REFERENCE TO RELATED APPLICATIONS

This application claims the benefit of French Patent Application No. 2206736, filed on Jul. 4, 2022, which application is hereby incorporated herein by reference.

TECHNICAL FIELD

Embodiments and implementations relate to the management of access rights of memory regions and a corresponding a system-on-chip.

BACKGROUND

Typically, during the procedure for booting systems-on-chip, the individual boot firmware is authenticated, and possibly decrypted, for the next step of the firmware by means of a signature mechanism. This creates a reliable boot chain.

Each boot firmware has the possibility to program a memory management and protection unit, typically a Memory Protection Unit (MPU) or a Memory Management Unit (MMU), to define which parts of the memory are executable and which are not.

But typically, the memory management and protection unit can be deactivated before jumping into the next firmware that will reconfigure it according to its needs. The deactivation of the memory management and protection unit can occur in the conventional case of a reboot or reset of the processor in the boot phase, which also resets the parameters of the memory management and protection unit.

If faults are injected at this time instant, it is possible to generate a glitch on the program counter ("PC") pointing to the memory address of an instruction to be executed, and as well as jump into a memory address containing an instruction that is not authenticated or that is not supposed to be executed.

To minimize this risk, conventional solutions provide authenticating the full image of the content loaded in the memory, guaranteeing the memory content by for example erasing all unused regions to avoid faulty code, keeping the memory management and protection unit active during reset, or providing a specifically executable non-volatile memory region for boot.

These conventional solutions present difficulties in that they degrade the performance of the system-on-chip, or create complex mechanisms that depend on the capacities of the processor and the memory management and protection unit, and may not be compatible with every firmware.

Thus, there is a need to address these drawbacks.

SUMMARY

Implementations and embodiments provide adding a new status in a firewall of the memory to define an execution permission for the different memory regions, that is, an executable or non-executable status, in a manner comparable to the read permission and write permission statuses of the memory regions in conventional firewalls.

Thus, in one aspect, a method is provided for managing access rights of memory regions of a memory, for example a volatile RAM (random access memory), comprising assigning an execution permission status for each memory region in a firewall device dedicated to the memory, so that the content of a memory region having an executable status is capable of being executed by a processor, and the content of a memory region having a non-executable status cannot be executed by the processor.

Accordingly, in the case of a fault injection attack and glitch generation on the program counter, it will not be possible to execute data or code contained outside the authenticated memory regions. Furthermore, this allows a software countermeasure to be implemented as the program counter of the processor remains inside the authenticated code.

According to one implementation, assigning the execution permission status comprises assigning the non-executable status to memory regions containing data.

Indeed, the data contained in memory can be read or written, but are never intended to be executed as a program code binary-recorded in the memory. This embodiment thus makes it possible to systematically prevent the erroneous execution of data.

According to one implementation, assigning the execution permission status comprises a phase of verifying authenticity of the content of the memory regions containing program code, assigning the executable status to the memory regions whose content is authenticated in the verification phase, and assigning the non-executable status to the memory regions whose content is not authenticated in the verification phase.

The authenticity verification phase may comprise an implementation of a hash function and possibly a decryption of the content of the memory regions.

According to one implementation, executing by the processor the content of a first memory region comprises a second phase of verifying authenticity of the content of a second memory region, the method comprising assigning the executable status to the second memory region if the content of the second memory region is authenticated in the second verification phase, and assigning the non-executable status to the second memory region if the content of the second memory region is not authenticated in the second verification phase.

Thus, the second memory region can be authenticated a second time during the execution of the content of the first memory region. The execution of the content of the first region may indeed make it possible to obtain additional authentication information to verify authenticity of the second memory region. This is for example the case when the second memory region contains an extension, owned by a user, whose authentication cannot be done by the system-on-chip in its initial configuration at boot.

According to one implementation, the execution permission status is assigned to each memory region in the firewall device in addition to a read permission status and a write permission status.

According to one implementation, the memory regions having the non-executable execution permission status may have the read permit or non-read permit status as well as the write permit or non-write permit status.

Indeed, unlike conventional techniques where the execution of the content of a memory region is prevented by parameterizing the read permission status of this region to "non-readable", the use of the execution permission status allows read access to a non-executable memory region. This makes it possible in particular to verify in read mode its authenticity or the nature of its content (for example binary code or data), without creating an execution flaw, for example in the event of a fault injection as mentioned above.

According to one implementation, the assignment of an execution permission status comprises, for each memory region, assigning different respective execution permission statuses to different processors, in the firewall device.

According to another aspect, there is provided a system-on-chip including a processor, a memory having memory regions, and a firewall device dedicated to the memory, wherein an access rights management system is configured to assign an execution permission status for each memory region in the firewall device, the firewall device and the processor being configured so that the content of a memory region having an executable status is capable of being executed by the processor, and the content of a memory region having a non-executable status cannot be executed by the processor.

According to one embodiment, the access rights management system is configured to assign the non-executable status to memory regions containing data.

According to one embodiment, the access rights management system is configured to verify authenticity of the content of memory regions containing program code, to assign the executable status to memory regions whose content is authenticated and to assign the non-executable status to memory regions whose content is not authenticated.

According to one embodiment, the access rights management system, upon execution of the content of a first memory region by the processor, is configured to secondly verify authenticity of the content of a second memory region, and to assign the executable status to the second memory region if the content of the second memory region is secondly authenticated, and to assign the non-executable status to the second memory region if the content of the second memory region is secondly not authenticated.

According to one embodiment, the access rights management system is configured to assign the execution permission status to each memory region in the firewall device in addition to a read permission status and a write permission status.

According to one embodiment, the access rights management system is configured to assign the read permission or non-read permission status as well as the write permission or non-write permission status to the memory regions having the non-executable execution permission status.

According to one embodiment, the system-on-chip further includes at least one other processor, and the access rights management system is configured to assign, for each memory region, different respective execution permission statuses to the different processors in the firewall device.

BRIEF DESCRIPTION OF THE DRAWINGS

Further advantages and characteristics of the invention will become apparent upon examining the detailed description of implementations and embodiments, which are not limiting, and the appended drawings, in which.

DETAILED DESCRIPTION OF ILLUSTRATIVE EMBODIMENTS

Figure 1:
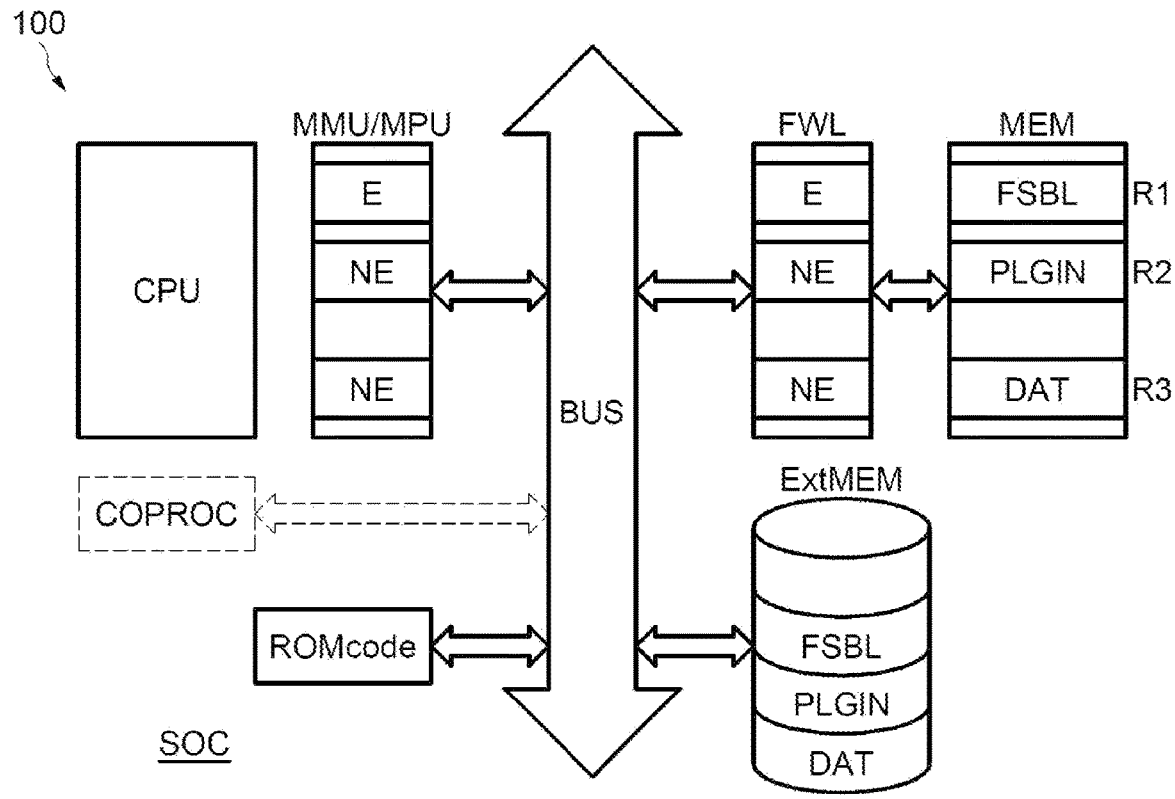
FIG. 1 illustrates an example embodiment of a system-on-chip with respect to a booting procedure.

FIG. 1 illustrates an example embodiment of a system-on-chip SOC, including in particular a processor CPU, a memory MEM of the RAM type, and a firewall device FWL dedicated to the memory MEM.

The different elements of the system-on-chip SOC are interconnected by an integrated system bus BUS, for example of the "AXI" type (Advanced eXtensible Interface").

The processor CPU is advantageously fitted with a memory management and protection unit MMU/MPU. Typically, depending on the type and performance of the processor CPU, the memory management and protection unit MMU/MPU can be a memory protection unit "MPU" or a memory management unit "MMU". The memory management and protection unit MMU/MPU typically enables the accesses that the processor CPU makes to the memory MEM to be controlled, and in particular, as a function of an access rights context in which the processor CPU is located, with respect to the memory regions R1, R2 of the memory MEM.

The firewall device FWL is dedicated to the memory MEM, and allows the accesses that are made to the memory to be controlled, from the processor CPU, or from a possible other master device connected to the bus BUS. The firewall FWL is configured to verify access right level of a request for access to the memory MEM, against the access right level required to access the corresponding memory region R1, R2, and to authorize or not the access.

In other words, the memory management and protection unit MMU/MPU provides protection related to the state of the processor CPU, while the firewall FWL provides protection related to the content of the memory regions R1, R2.

Moreover, the system-on-chip SOC may include an internal non-volatile memory (usually "Read Only Memory") containing elementary program code ROMcode for booting the system-on-chip SOC, and furthermore benefit from an external mass storage memory ExtMEM, for example a flash memory.

An access rights management system is configured to assign access rights to the different memory regions R1, R2, and may typically be embodied by a secure context of the processor CPU.

Optionally, the access rights management system can be embodied by a security coprocessor COPROC dedicated to the management of access rights and to the authentication of the contents loaded in memory MEM. The security coprocessor COPROC is in particular advantageous in the case where the system-on-chip SOC includes several master devices able to access the memory, in particular in the case of a multi-processor system-on-chip, including several processors CPUs.

For example, the access rights may conventionally comprise a read permission status "rd" (FIG. 4) and a write permission status "wr" (FIG. 4) for each memory region R1, R2, and for each master device CPU capable of generating a request for access to the memory MEM.

Furthermore, the access rights management system CPU, COPROC is configured to assign an execution permission status "exe" (FIG. 4), which can be either "executable" E or "non-executable" NE, for each memory region R1, R2 in the firewall device FWL, and for each master device CPU capable of generating a request for access to the memory MEM. Access rights management system CPU, COPROC may be implemented using a processor circuit, such as a microprocessor, microcontroller or other processing circuit known in the art coupled to a non-transitory computer readable medium such as a volatile or non-volatile memory that includes instructions stored thereon. When the instructions are executed by the processor circuit, the processor circuit may be enabled to perform the methods and operations described herein.

The memory regions having the non-executable execution permission status NE may independently have the read permission or non-read permission status as well as the write permission or non-write permission status.

In particular, in the steps 100 and 300 described below, the implementations of program code authenticity verifications should advantageously have a read access to the corresponding memory regions.

The non-executable status NE thus makes it possible to authorize the reading of the memory regions, without opening a risk of illicit execution of the content of these memory regions.

The firewall device FWL and the processor CPU are configured so that the content of a memory region having an executable status E is capable of being executed by the processor CPU, and the content of a memory region having a non-executable status NE cannot be executed by the processor CPU.

Indeed, the requests for access to the memory communicated on the bus BUS may include information representative of the fact that the content of the accessed memory region R1, R2 is intended to be executed by the processor CPU. This is in particular the case for integrated system buses of the "AXI" type.

For example, the execution information can be communicated in the form of a dedicated bit in the header data of the request, the request including moreover other information such as the address of the memory region to be accessed.

Thus, a request for execute access to a memory region R2 having the non-executable status NE in the firewall FWL, will be blocked by the firewall FWL and will not result in a transmission of the content of this memory region R2 to the master device CPU having issued the request.

Figure 2:
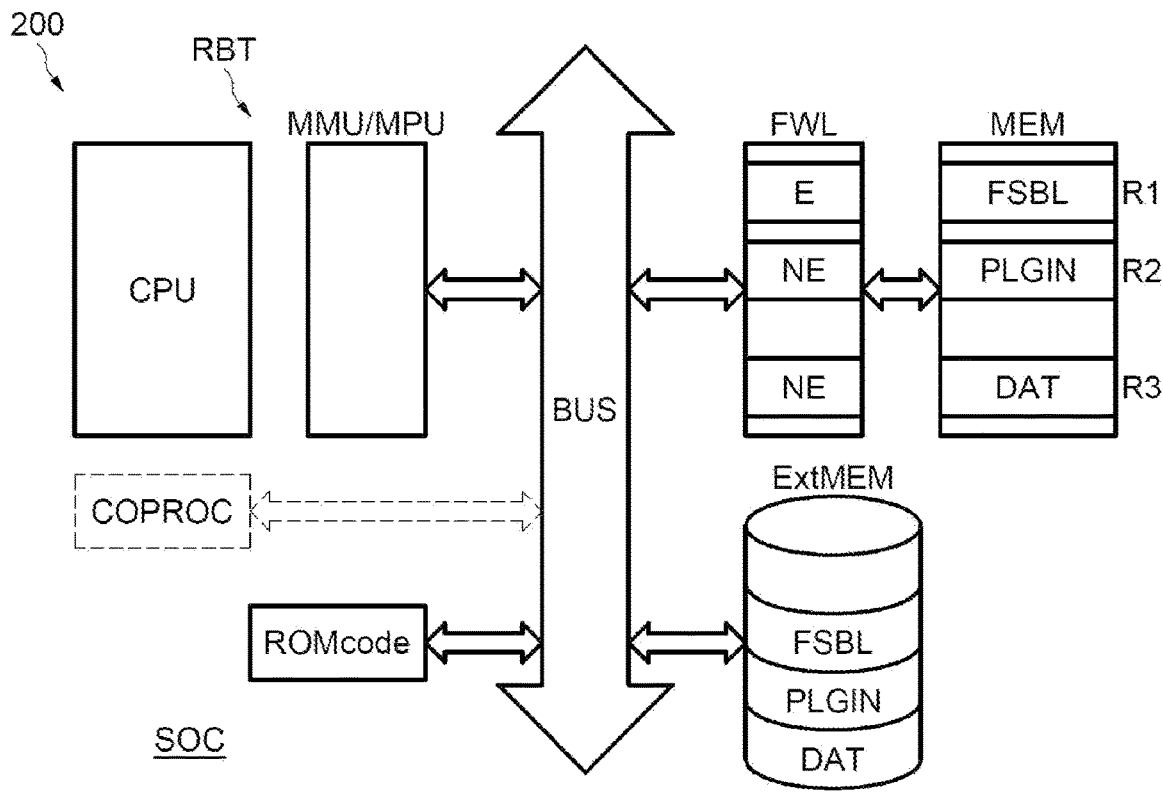
FIG. 2 illustrates the system-on-chip of FIG. 1 during a second step of a booting procedure.
Figure 3:
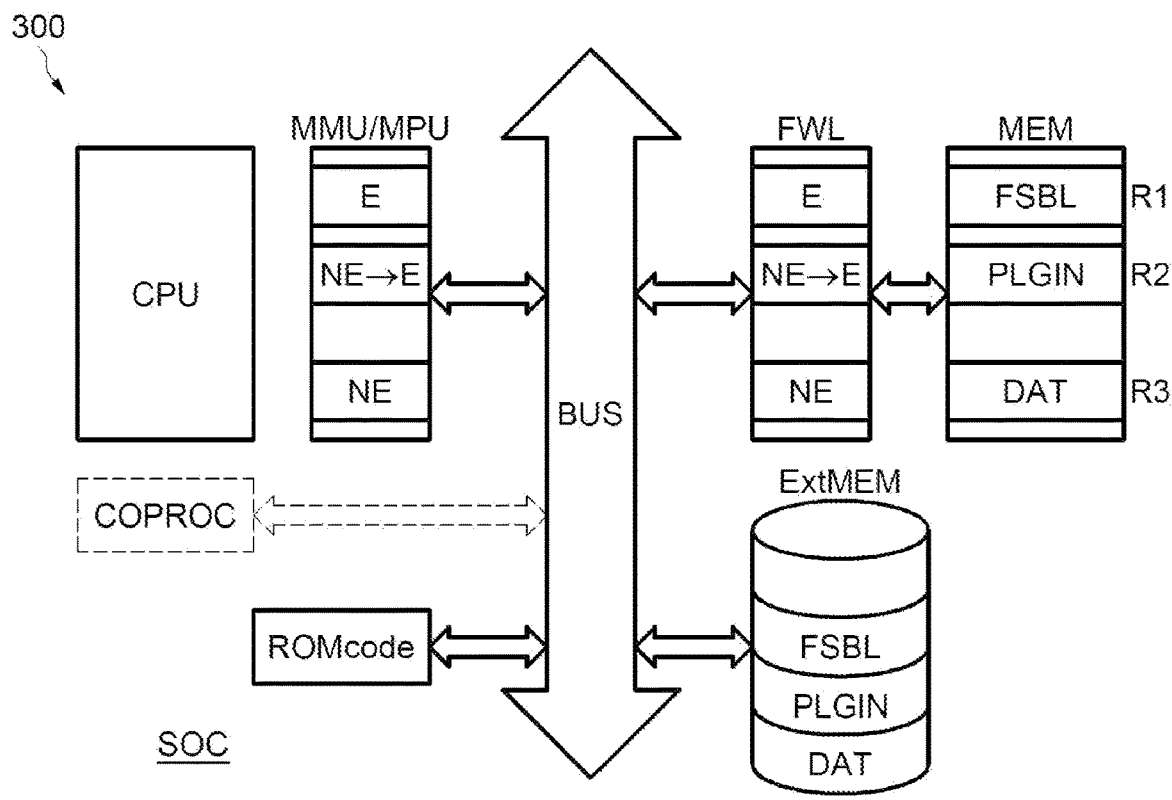
FIG. 3 illustrates the system-on-chip of FIGS. 1 and 2 during a third step of a booting procedure.

FIGS. 1 to 3 illustrate steps 100, 200, 300 of an example of application of the protection mechanism obtained by the execution permission status E, NE of the contents of the memory regions R1, R2 in the firewall FWL, in the context of an initial boot of the system-on-chip SOC.

In this respect, FIG. 1 illustrates a step 100 of the procedure for booting the system-on-chip SOC, at the beginning of which the elementary boot code ROMcode is executed.

The elementary boot code ROMcode controls for example loading of a binary firmware FSBL and an extension of this binary firmware PLGIN from the external mass storage memory ExtMEM to a first region R1 and a second region R2 of the random-access memory MEM, respectively. Furthermore, data DAT may be loaded in a third memory region R3 of the random-access memory MEM, for example also from the external mass storage memory ExtMEM.

In this example, the firmware FSBL may include first stage bootloader instructions and, prior to execution thereof, the firmware FSBL is authenticated by the elementary boot procedure ROMcode.

In this respect, the elementary boot procedure ROMcode provides a phase of verifying authenticity of the content of the memory regions R1, R2 containing program code FSBL, PLGIN. The authenticity verification phase is implemented by the access right management system CPU, COPROC.

For example, the authenticity verification can be done with a hash mechanism of the binary code loaded in the memory regions R1, R2, and an identification of a signature with a known key and contained in the elementary code ROMcode.

The firmware FSBL can be authenticated, that is, validated by the authenticity verification phase, and the "executable" status E is assigned to the first memory region R1 in the firewall FWL and in the memory management and protection unit MMU/MPU, by the access rights management system CPU, COPROC.

The extension PLGIN may however come from a third party, and accordingly be signed by a specific key unknown to the elementary boot code ROMcode.

Accordingly, the extension PLGIN is not authenticated in the phase of verifying the elementary code ROMcode, and the "non-executable" execution permission status NE is assigned to the second memory region R2, in the firewall FWL and in the memory management and protection unit MMU/MPU, by the access rights management system CPU, COPROC.

Finally, the non-executable status NE is advantageously assigned automatically to memory regions containing data DAT, that is, in this example to the third memory region R3.

Thus, the execution permission statuses NE, E have been set for the FSBL, PLGIN, DAT contents loaded in the memory regions R1, R2, R3 of the memory MEM.

Reference is now made to FIG. 2.

FIG. 2 illustrates the system-on-chip SOC described in connection with FIG. 1, in a second step 200 of the procedure for booting the system-on-chip SOC, in which the firmware FSBL loaded in the memory MEM is to be executed by the processor CPU.

The second step 200 typically comprises a "warm reboot" RBT of the CPU to place the processor CPU in a virgin state to execute the firmware FSBL.

Accordingly, the protections parameterized in the memory management and protection unit MMU/MPU are also set again to a virgin state by resetting RBT the processor CPU.

In the conventional case, that is, in the absence of execution permission statuses in the firewall FWL, there is a window of vulnerability before the memory management and protection unit MMU/MPU is parameterized again, during which a memory region R2, R3 that has not been authenticated or contains data could be illegitimately executed.

However, the firewall FWL dedicated to the memory has not been impacted by the reset RBT of the processor CPU and the memory management and protection unit MMU/CPU, and its protection remains active in this vulnerability window. Thus, neither the unauthenticated program code PLGIN in the second R2 region nor the data DAT in the third R3 region can be executed.

The firmware FSBL can therefore be executed without risk.

Reference is now made to FIG. 3.

FIG. 3 illustrates the system-on-chip SOC described in connection with FIGS. 1 and 2, in a third step 300 of the procedure for booting the system-on-chip SOC, in which the firmware FSBL loaded in the memory MEM is executed by the processor CPU.

On the one hand, the execution of the firmware FSBL advantageously comprises setting again the parameterization of the memory management and protection unit MMU/MPU, as in step 100.

On the other hand, the execution of the firmware FSBL may be able to authenticate the program code of the extension PLGIN, with a second authenticity verification phase, analogous to the first verification phase described in connection with FIG. 1, but with the knowledge of the specific key from the third-party owners of the extension PLGIN.

Thus, the extension PLGIN can be authenticated, that is, validated by the second authenticity verification phase, and the execution permission status of the second memory region R2 is updated "NE→E" to the executable status E in the firewall FWL and in the memory management and protection unit MMU/MPU, by the access rights management system CPU, COPROC.

The authenticity verification phases implemented in steps 100 and 300 may result in invalidation of the contents loaded in the memory MEM, for example due to accidental or spurious corruption of the loaded data. If the content of a memory region containing program code R1, R2 is not authenticated, then the non-executable status NE is assigned to that memory region R1, R2.

Steps 100, 200 and 300 have been described in an application of the procedure for booting the System-on-Chip SOC, however, the solution described in steps 100, 200 and 300 can be applied to any other program load, including for example and in particular a "warm reset" RBT of the processor CPU.

Figure 4:
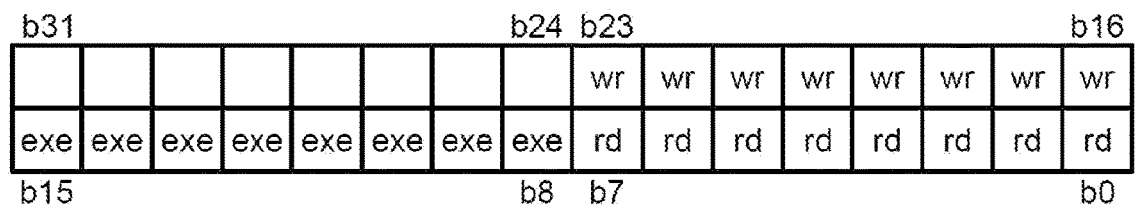
FIG. 4 illustrates an example of information contained in the firewall for assigning read, write, and execute access rights.

FIG. 4 illustrates an example of information contained in the firewall FWL for assigning read rd, write wr, and execute exe access rights.

A thirty-two (32) bit register is for example provided for each memory region R1, R2, R3 of the memory MEM. For example, a memory region may be a memory page, that is, a unit of the physical or functional segmentation of the memory; possibly, a region having a start address and size dynamically defined as a function of the stored content.

In this example, the register of each memory region is able to contain the particular access rights of eight (8) different master devices, that is, the read rd, write wr and execute exe permission statuses of each of the eight (8) masters.

For example, the eight (8) bits b0 to b7 of the register are dedicated to the read rd permission statuses of the respective eight (8) masters; the eight (8) bits b16 to b23 of the register are dedicated to the write wr permission statuses of the respective eight (8) masters; and the eight (8) bits b8 to b15 of the register are dedicated to the execution exe permission statuses of the respective eight (8) masters. The eight (8) bits b24 to b31 of the register may be reserved for another application.

Thus, the embodiments and implementations described in connection with FIGS. 1 to 4, in which a new status is added into the firewall FWL of the random-access memory MEM to define the execution permission of the content of the different memory regions, provide an additional protection, relating to the execution of the content of the memory regions, and which is related to the content of the memory and not to the processor state.

This additional protection makes it possible to prevent illicit execution of the content of the memory, in particular in the event of a fault injection attack and glitch generation on the program counter.

In the embodiments and implementations described above, it is indeed not possible to execute data or code contained outside the authenticated regions, and software countermeasures can be executed as part of the authenticated code.

Moreover, the embodiments and implementations described above have the advantages of not being dependent on the processor CPU architecture; being compatible with current software component configurations, in particular with open source firmware; being compatible in a multi-processor system, in particular when authentication is delegated to the security coprocessor COPROC; being compatible with hot resets RBT of the processor CPU and the memory management and protection unit MMU/MPU; and being based on the memory firewall hardware device FWL and thus being able to be integrated into a security infrastructure.

What is claimed is:

1. A method for managing access rights of memory regions of a memory, the method comprising:
performing authenticity verification of content of memory regions containing program code using a hash function, signature verification, or a combination thereof; and
assigning an execution permission status for each memory region in a firewall device dedicated to the memory based on the authenticity verification, comprising:
performing a first phase of verifying an authenticity of the content of memory regions containing program code using a hash mechanism of binary code loaded in the memory regions and identification of a signature with a known key,
assigning the executable status to memory regions whose content is authenticated in the first phase of verifying authenticity, and
assigning the non-executable status to memory regions whose content is not authenticated in the first phase of verifying authenticity,
wherein content of a memory region having an executable status is permitted to be executed by a processor in response to the content being authenticated by the authenticity verification, and
wherein content of a memory region having a non-executable status is not permitted to be executed by the processor in response to the content not being authenticated by the authenticity verification.

2. The method according to claim 1, wherein assigning the execution permission status comprises assigning the non-executable status to memory regions containing data.

3. The method according to claim 2, wherein assigning the execution permission status further comprises, upon executing content of a first memory region of the memory:
performing a second phase of verifying an authenticity of the content of a second memory region using a hash mechanism of binary code loaded in the second memory region and identification of a signature with a key different from the known key used in the first phase;
assigning the executable status to the second memory region in response to the content of the second memory region being authenticated in the second phase of verifying; and
assigning the non-executable status to the second memory region in response to the content of the second memory region not being authenticated in the second phase of verifying.

4. The method according to claim 1, further comprising wherein assigning a read permission status and a write permission status for each memory region in the firewall device.

5. The method according to claim 4, wherein the memory regions having the non-executable status are configured to have the read permission status or a non-read permission status, and the write permission status or a non-write permission status.

6. The method according to claim 1, wherein assigning the execution permission status further comprises, for each memory region, assigning respective different execution permission statuses to different processors, in the firewall device.

7. A system-on-chip comprising:
a processor;
a memory having memory regions;
a firewall device dedicated to the memory; and
an access rights management system configured to:
  perform authenticity verification of content of memory regions containing program code using a hash function, signature verification, or a combination thereof,
  assign an execution permission status for each memory region in the firewall device based on the authenticity verification,
  verify an authenticity of the content of the memory regions containing program code using a hash mechanism of binary code loaded in the memory regions and identification of a signature with a known key;
  assign the executable status to memory regions whose content is authenticated, and
  assign the non-executable status to memory regions whose content is not authenticated,
wherein the firewall device and the processor are configured to:
  permit content of a memory region having an executable status to be executed by the processor in response to the content being authenticated by the authenticity verification, and
  forbid content of a memory region having a non-executable status from being executed by the processor in response to the content not being authenticated by the authenticity verification.

8. The system-on-chip according to claim 7, wherein the access rights management system is further configured to assign the non-executable status to memory regions containing data.

9. The system-on-chip according to claim 7, wherein the access rights management system, upon execution of content of a first memory region by the processor, is configured to:
  verify an authenticity of content of a second memory region using a hash mechanism of binary code loaded in the second memory region and identification of a signature with a key different from the known key used in a previous memory region;
  assign the executable status to the second memory region whose content is authenticated; and
  assign the non-executable status to the second memory region whose content is not authenticated.

10. The system-on-chip according to claim 7, wherein the access rights management system is further configured to assign a read permission status and a write permission status for each memory region in the firewall device.

11. The system-on-chip according to claim 10, wherein the access rights management system is further configured to assign the read permission status or a non-read permission status, and the write permission status or a non-write permission status to memory regions having the non-executable status.

12. The system-on-chip according to claim 7, further including at least one other processor, wherein the access rights management system is configured to assign, for each memory region, different respective execution permission statuses to the processor and the at least one other processor, in the firewall device.

13. The system-on-chip of claim 7, wherein the access rights management system comprises a co-processor coupled to the firewall device via a bus or is implemented using the processor.

14. A system comprising:
a processor configured to be coupled to a firewall device via a bus, wherein the firewall device is dedicated to a system memory comprising memory regions; and
a program memory coupled to the processor with instructions stored thereon, wherein the instructions, when executed by the processor, enable the processor to:
  perform authenticity verification of content of memory regions containing program code using a hash function, signature verification, or a combination thereof,
  assign an execution permission status in the firewall device for each memory region in the system memory based on the authenticity verification,
  verify an authenticity of the content of memory regions containing program code using a hash mechanism of binary code loaded in the memory regions and identification of a signature with a known key,
  assign the executable status to memory regions whose content is authenticated, and
  assign the non-executable status to memory regions whose content is not authenticated,
  permit content of a memory region having an executable status to be executed by the processor in response to the content being authenticated by the authenticity verification, and
  forbid content of a memory region having a non-executable status from being executed by the processor in response to the content not being authenticated by the authenticity verification.

15. The system of claim 14, wherein the instructions, when executed by the processor, further enable the processor to, upon execution of content of a first memory region by the processor:
  verify an authenticity of content of a second memory region using a hash mechanism of binary code loaded in the second memory region and identification of a signature with a key different from the known key used in a previous memory region;
  assign the executable status to the second memory region whose content is authenticated; and
  assign the non-executable status to the second memory region whose content is not authenticated.

16. The system of claim 14, wherein the instructions, when executed by the processor, further enable the processor to assign a read permission status and a write permission status for each memory region in the firewall device.

17. The system of claim 14, further comprising:
the system memory; and
the firewall device.

18. The system of claim 14, further including at least one other processor, wherein the instructions, when executed by the processor, enable the processor to assign, for each memory region, different respective execution permission statuses to the processor and the at least one other processor, in the firewall device.

19. The system of claim 14, wherein the system comprises a co-processor coupled to the firewall device via a bus.

20. The system of claim 14, wherein the instructions, when executed by the processor, assign a read permission status or a non-read permission status, and a write permission status or a non-write permission status to memory regions having the non-executable status.

\* \* \* \* \*